US008456704B2

(12) United States Patent
Monga et al.

(10) Patent No.: US 8,456,704 B2
(45) Date of Patent: *Jun. 4, 2013

(54) COLORIMETRIC MATCHING THE PERCEPTION OF A DIGITAL DATA FILE TO HARDCOPY LEGACY

(75) Inventors: Vishal Monga, Webster, NY (US); Judith Stinehour, Rochester, NY (US); Reiner Eschbach, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 449 days.

This patent is subject to a terminal disclaimer.

(21) Appl. No.: 12/814,579

(22) Filed: Jun. 14, 2010

(65) Prior Publication Data

US 2011/0304861 A1    Dec. 15, 2011

(51) Int. Cl.
  *H04N 1/48* (2006.01)
  *H04N 1/40* (2006.01)
  *H04N 1/46* (2006.01)
  *G03F 3/08* (2006.01)

(52) U.S. Cl.
  USPC ............ 358/1.9; 358/401; 358/448; 358/501; 358/518; 358/519; 358/520; 358/521; 358/522

(58) Field of Classification Search
  None
  See application file for complete search history.

(56) References Cited

U.S. PATENT DOCUMENTS

| 7,649,649 | B2 |   | 1/2010 | Eschbach et al. |
|---|---|---|---|---|
| 7,649,650 | B2 | * | 1/2010 | Eschbach ..................... 358/1.9 |
| 2004/0096102 | A1 | * | 5/2004 | Handley ....................... 382/164 |
| 2004/0264781 | A1 |   | 12/2004 | Eschbach et al. |
| 2005/0134934 | A1 |   | 6/2005 | Unal et al. |
| 2006/0066908 | A1 | * | 3/2006 | Kim ............................. 358/3.2 |
| 2008/0198392 | A1 | * | 8/2008 | Moriyama .................... 358/1.9 |

* cited by examiner

*Primary Examiner* — Benny Q Tieu
*Assistant Examiner* — Haris Sabah
(74) *Attorney, Agent, or Firm* — Fay Sharpe LLP

(57) ABSTRACT

A system/method of color match assessment for electronic documents includes receiving digital data defining a composite electronic document including a raster image object having an edge and a color graphics object bordering the edge of the raster image object. The pixel color values defining the edge of the raster image object are processed to estimate a local color variance of the pixel color values. The local color variance is used to determine if the edge can be color matched to the bordering color graphics object. If the edge can be color matched, a match color for the edge is derived. The match color is associated with the digital data defining the electronic document so that a downstream object color match system can use the match color as needed.

22 Claims, 4 Drawing Sheets

COLORIMETRIC MATCHING THE PERCEPTION OF A DIGITAL DATA FILE TO HARDCOPY LEGACY

BACKGROUND

It is not uncommon that a person possesses a legacy hardcopy that is deemed satisfactory or even ideal, and also possesses the original electronic file comprising the digital image data on which the legacy hardcopy is based, and now desires to print one or more hardcopies that match the legacy hardcopy. A problem arises when the legacy hardcopy is not merely a print-out of the raw digital image data of the electronic file but is, instead, a print of an enhanced or altered version of the digital image data of the electronic file. For example, the legacy hardcopy can be a printed version of the original digital image data that was enhanced by a technician to make the ocean more blue, to make a sunset more orange, to make a headline font more red, etc.

One approach to the problem is to scan the legacy hardcopy to derive scanner image data from which the new hardcopies can be printed, essentially copying the hardcopy data. One drawback of this method is that the legacy hardcopy might include artifacts such as fold-lines, coffee stains or other physical marks that must be excluded from any newly generated hardcopy. Another drawback associated with the use of a scanner is that the original image data of the electronic file is, by definition, a perfect match to the legacy hardcopy, except for the above-noted image enhancement, while data derived from scanning the legacy hardcopy will include noise that will degrade the quality of any subsequent prints.

Accordingly, a need has been identified for a system that allows new hardcopies to be printed from the original image data, wherein the new hardcopies are perceived to match the legacy hardcopy.

INCORPORATION BY REFERENCE

The following references are incorporated by reference in their entirety:
U.S. Patent Application Publication No. 2004/0264781 to Eschbach et al. and
U.S. Patent Application Publication No. 2005/0134934 to Unal et al.

BRIEF DESCRIPTION

In accordance with one aspect of the present development, a method for color matching original image data to a printed hardcopy document previously generated from the original image data comprises: inputting the original image data; scanning the printed hardcopy to derive and input scanner image data that represent the printed hardcopy; identifying constant color objects in the original image data; for the constant color objects in the original image data, identifying respective corresponding hardcopy color areas in the scanner image data; analyzing color differences between the constant color objects and the corresponding hardcopy color areas to determine a printing device assumption to predict a printing device on which the printed hardcopy document was previously printed; based upon the predicted printing device, converting at least the constant color objects and the respectively corresponding hardcopy color areas into a colorimetric color space; adjusting a color of at least one of the constant color objects to match a corresponding color of the respectively corresponding hardcopy color area in the colorimetric color space; determining at least one measurement area located on the printed hardcopy document; measuring colorimetrically the at least one measurement area; comparing the at least one measurement area to an expected color value; and, adjusting another color of at least another one of the constant color objects to match a corresponding color of the respectively corresponding hardcopy color area in the at least one measurement area.

In accordance with another aspect of the present development, a method for printing a new hardcopy using a legacy hardcopy and an electronic file of the original image data is provided, wherein the legacy hardcopy was printed from a modified version of the original image data. The method comprises: inputting the original image data into an image processing unit; scanning the legacy hardcopy to derive scanner data that describe the legacy hardcopy and inputting the scanner data into the image processing unit; identifying a plurality of different color objects in the original image data; identifying a plurality of different color areas in the scanner data, wherein the plurality of color areas correspond respectively to and result from the plurality of color objects identified in the original image data, wherein the color objects and the color areas corresponding respectively thereto define a plurality of color pairs; converting the color pairs into a colorimetric color space; based on at least one color pair, creating a new mapping between digital input colors and requested print colors; additionally, determining at least one measurement area from the digital data that has the attribute of being visually relevant—i.e.: being of constant color and large enough to form an accurate visual match—and creating a colorimetric measurement of the at least one measurement area; comparing the at least one measurement area to an expected color value; and, adjusting another color of at least another one of the constant color objects to match a corresponding color of the respectively corresponding hardcopy color area in the at least one measurement area where dependent on the object type, the colorimetric adjustment is done locally in color space (i.e.: to that color alone) or the colorimetric measurement is used to refine color space.

In accordance with another aspect of the present development, a printing method comprises: inputting an electronic file comprising original digital image data; scanning a printed legacy hardcopy image that was previously printed from the electronic file to derive scanner image data; identifying a color area in the original digital image data; identifying a corresponding color area in the scanner image data that corresponds to the color area; defining an adjusted electronic file comprising adjusted digital image data that represent the legacy hardcopy by adjusting a color of the color area in the original digital image data to match a corresponding color of the corresponding color area; determining from the electronic data file areas that are visually relevant with respect to human color vision and creating a colorimetric measurement of the areas; and, using the colorimetric measurements to update the scanner based measurements in the previous step.

BRIEF DESCRIPTION OF THE DRAWINGS

The development comprises various steps and/or components and/or arrangements of same, embodiments of which are illustrated in the accompanying drawings that form a part hereof, wherein.

DETAILED DESCRIPTION

The present development provides a system and/or method for generating one or more new hardcopy prints from an electronic file comprising original digital image data, wherein the new hardcopy print(s) match a legacy hardcopy previously generated from the original digital image data of the electronic file, even when the legacy hardcopy was printed from an "enhanced" or "tuned" version of the original image data, i.e., from a version of the original image data wherein color was adjusted smoothly to provide the legacy hardcopy with certain desired visual characteristics or where the legacy hardcopy had been printed without proper color management as specified in the original electronic data file.

The present development provides that four separate assumptions be satisfied: (i) a correspondence assumption, i.e., the electronic file is the fundamental source for the legacy hardcopy; (ii) a satisfaction assumption, i.e., the person requesting one or more new hardcopies to match the legacy hardcopy is satisfied with certain aspects of the legacy hardcopy, even if he/she cannot articulate these satisfactory aspects; (iii) a marking technology assumption, i.e., the legacy hardcopy was printed using a known conventional or commercial marking (printing) technology known in the art (e.g., offset, xerography, inkjet, etc.) rather than by hand or using some unconventional printing technique; (iv) a small perturbation assumption, i.e., any enhancement/modification of the original image data of the electronic file to produce the legacy hardcopy was a limited and rational and smooth change of the original image data rather than a radical or arbitrary operation. These four assumptions have a very high probability of being true in real-world imaging applications. If any of the above assumptions is not satisfied, the process generally will lead to unsatisfactory results.

Figure 1:
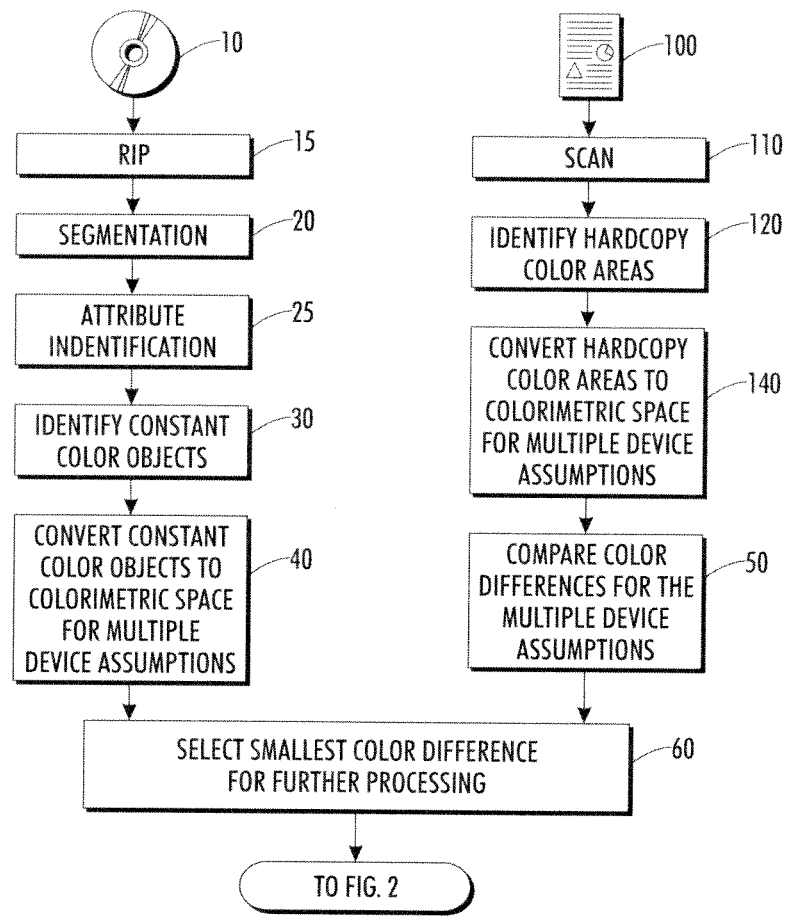
FIG. 1 is a diagrammatic illustration of a first portion of a system and method in accordance with the present development.

FIG. 1 discloses a first aspect of the present development. The electronic file 10 comprising the original digital image data, which can be supplied on a diskette, compact disk, portable memory device, or by a network connection or by other means, is input to a raster image processor (RIP) 15, wherein the original image data are RIPped into "raw" raster image data, if not already in raster form, so that all page description language (PDL) elements are converted to pixel data using associated cyan, magenta, yellow, black (cmyk) values. If the original image data are already in a raster form, e.g., cmyk TIFF data, the RIP process is skipped.

In a step 20, the raster data are segmented into pixel-based objects as is generally known in the digital imaging art, wherein each segmented object is defined by a discrete region of pixels defining a particular type of object, e.g., text, a continuous tone photograph, a raster image, a graphics object, a halftone image, a background object, etc. It should be noted that this segmentation step is greatly simplified by the existence of the electronic original. The electronic original object sizes and locations can directly be used to identify the corresponding page areas in the hardcopy scan. Using the correspondence assumption above, one knows that simple spatial transforms (scale, rotation, small shears, and the like) can create spatial correspondence between scan and electronic data and that the labeling of the scan data can subsequently derived from the electronic data. Note that the object type definitions are functional and consistency is more important than agreement to humanly applied labels.

In an attribute identification operation 25, at least some of the segmented objects output by the segmentation operation 20 are processed to identify attributes that describe the object. The identified attributes may vary depending upon the type of object. For example, a raster image is processed to identify attributes such as size, location, average color, color variance; a graphics object is processed to identify attributes such as size, location, cmyk color value(s). Accurate knowledge of each individual pixel property is not a requirement for subsequent processing as described below, and this provides an advantage to the present development in terms of reduced processing complexity.

Based upon the above processing, in a color identification operation 30, objects of constant color are identified in the original image data—referred to herein as "constant color objects." The term "constant color" is intended to encompass objects and areas defined by pixels of identical color values (e.g., a single-color graphics object) and/or objects and areas defined by pixels with low color variance. This can be understood regarding the following example: a photo of a solid green paint area might have a mean of 166 in the green channel, at the same time, the standard deviation of the patch might be 4 units. Or the photo of a red brick which would visually be considered "constant", in the actual image data might have a mean of 185 in the red channel, at the same time, the standard deviation of the patch might be 15 units. Preferably, as part of this color identification operation 30, only objects of constant color above a pre-defined spatial size threshold are identified, e.g., at least 1 cm by 1 cm in size or the equivalent of the total spatial area defined by the original image data. It is understood that the underlying assumption is that of visual relevance, meaning that the object/area is constant enough to be color compared by a human and that the object/area is large enough to be color compared by a human. Based on the standard observer, i.e. a 2° field of view being the basis of colorimetric definitions, thus all areas that are considered as constant should be at least of that size, which translates into roughly one centimeter at a viewing distance of 30 cm. Larger areas will be treated preferentially with the 2° field being a reasonable lower bound for the size. The constant color objects are identified in the step 30 in order to guide subsequent processing due to the fact that: (i) the constant color objects offer a higher visual distinction to a viewer of a hardcopy image and are thus more likely to be a source of a perceived mismatch between a new hardcopy and the legacy hardcopy; and, (ii) the constant color objects in the original image data allow for the identification of corresponding areas (i.e., areas printed based upon the constant color object data) in the legacy hardcopy (and scanner image data derived from the legacy hardcopy as described below). Examples of such constant color objects are large text areas (headlines) or logos or graphic elements, such as banners. Examples of constant color objects that show some variation in the digital data are compressed color objects, scans of color objects embedded in the digital data and the like. Small elements including small text are ignored, because it is well known that small text cannot be judged accurately with respect to color.

With continuing reference to FIG. 1, it can be seen that the legacy hardcopy 100 is also processed according to the present development. In a first operation 110, the legacy hardcopy is scanned to derive scanner image data that represent the legacy hardcopy 100. The present development provides that, for all or at least some of the original constant color objects identified in the original image data in step 30, a respective corresponding hardcopy color area be identified in the scanner image data. As such, in a step 120, the scanner image data file is processed to identify hardcopy color areas in the scanner image data that correspond respectively to, i.e., that were respectively printed based upon, the constant color objects identified in the original image data. A constant color object and its corresponding hardcopy color area represented in the scanner image data are referred to herein as a "color pair." A 100% success rate for the step 120 is not required, i.e., it is sufficient that at least one and preferably a plurality of color pairs be identified. It is important to understand that two different "constant color" are used, namely a "constant color" as seen by a scanner for processing and a "constant color" that is humanly relevant. The "constant color" for the processing of scanner data in general is much smaller than the above mentioned 1 cm by 1 cm and is used to ascertain that the color data is not an actual image edge. The human relevant "constant color" is much larger, as it is bound by the limitations of the human visual system in terms of color matching for different area sizes. In essence, measurement devices are able to measure areas smaller than those that are visually relevant. Hereinafter, the scanner relevant size will be assumed when constant color is discussed, unless noted otherwise.

At this stage, the original image data and scanner image data, at least for the color pairs, are converted to a colorimetric color space in steps 40,140, respectively. As used herein, "colorimetric color space" is intended to mean any color space that can be converted to a standard CIE color space. Examples of a colorimetric color space include CIELab, Xerox RGB, PhotoYCC, sRGB and the like. As is known in the art, however, the conversion of scanner image data from a device-dependent color space to a colorimetric space utilizes a printing/marking device assumption, i.e., an assumption about the marking device that printed the image data. The printing device for the legacy hardcopy 100 is unknown but the possibilities are limited due to the "marking technology assumption" described above, i.e., that the legacy hardcopy was printed using a known conventional marking (printing) technology known in the art (e.g., offset, xerography, inkjet, etc.) rather than by hand or using some unconventional printing technique. In steps 40,140, at least one and preferably more of the color pairs of the original image data and scanner image data are converted to a colorimetric color space using a plurality of different printing device assumptions.

In a step 50, a color difference is determined between the members of each color pair in the colorimetric color space, for each printing device assumption. In other words, for one or more color pairs, a first color difference between the color pairs is determined for colorimetric color space data derived using a first printing device assumption; a second color difference between the same color pairs is determined for colorimetric color space data derived using a second printing device assumption; etc. Because the same printing device assumption is used for the members of a color pair, the number of color space conversions and color difference calculations is reduced from $N^2$ to N. Additional techniques such as described in U.S. Patent Application Publication No. 2004/0264781 to Eschbach et al. and U.S. Patent Application Publication No. 2005/0134934 to Unal et al., both of which documents are hereby expressly incorporated by reference into the present specification, can be used to further reduce the number of possible conversions.

In a step 60, the printing device assumption that provides the smallest color difference between the members of at least one and preferably all of the color pairs is selected as the printing device assumption to be used for the remainder of the matching process in accordance with the present development. It should be noted that the device assumption selected in step 60 need not be "correct" in the sense that the legacy hardcopy 100 need not have been actually printed using the marking device corresponding to the selected device assumption.

Figure 2:
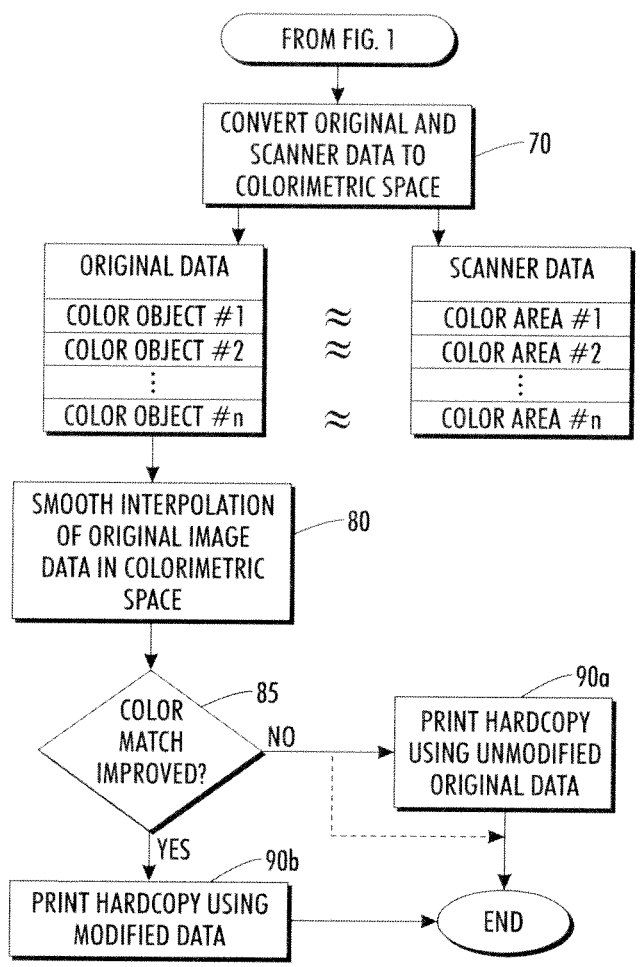
FIG. 2 is a diagrammatic illustration of a second portion of a system and method in accordance with the present development.

As shown in FIG. 2, in a step 70, the entire original image data file (or at least the constant color object data) and the entire scanner data file (or at least the hardcopy color area data) are converted to a colorimetric color space using the printing device assumption selected in step 60. Note that the colorimetric color space for step 70 is typically the same as the colorimetric color space described above with reference to FIG. 1, but can be a different colorimetric color space.

As shown in FIG. 2, the original image data and scanner image data are then both represented in a colorimetric color space, wherein the color pairs differ from each other in terms of color by only a small amount, where small refers to an amount that is in the order of variations commonly associated with machine variability and print enhancement/tuning. Then, a step 80 is carried out to smoothly interpolate the original image data so that the color difference for each color pair is minimized. The step 80 can be completed in several alternative variations. In one case, only those data corresponding to the constant color objects are adjusted in the colorimetric color space to match the color of their respective corresponding hardcopy color areas in the scanner data. In another embodiment, the entire original image data file is adjusted in the colorimetric color space so that each constant color object is adjusted to match the color of their respective corresponding hardcopy color areas in the scanner data. In either case, the color adjustment is carried out to adjust the average color of the object (or complete file) as a whole rather than as an independent adjustment of individual pixel color values on a pixel-by-pixel basis, i.e., if a particular pixel value x is mapped to x+3, this mapping will be done for all instances of the pixel value x instead of just certain instances of the pixel value x. Also, the black and white "luminance" values are preferably not adjusted.

As noted above, the present development is dependent on a "small perturbation assumption," i.e., an assumption that any enhancement of the original image data of the electronic file 10 was a limited and rational and smooth tuning of the original image data rather than a radical or arbitrary operation to obtain the legacy hardcopy. Examples of such a radical operation would be (1) the inversion of one channel, or (2) the exchange of the red and blue channel. As such, those of ordinary skill in the art will recognize that, if the small perturbation assumption is correct, smooth adjustment of the data defining the constant color objects (with or without the remainder of the original input data) will be possible in a manner that will reduce the color difference between each color pair.

A step 85 determines if color match between the color pairs is improved. This is accomplished by an automated calculation of the difference in colorimetric values and comparison of the difference to an acceptable tolerance threshold or, alternatively, by a user comparison of a video screen or proof print. If the color match is not improved, it is likely that the small perturbation assumption is not valid for the legacy hardcopy 100, and a new hardcopy is printed in a step 90*a* using the unmodified original image data file 10 as input to the printing process 90*a* or the process is terminated without any printing operation as indicated by the broken line. If the step 85 determines that color match is improved because the color difference between one or more color pairs is reduced or eliminated, a step 90*b* is carried out to print one or more new hardcopies using the adjusted original image data as output from the color-adjustment step 80 as input to the printing process 90*b*.

Figure 3:
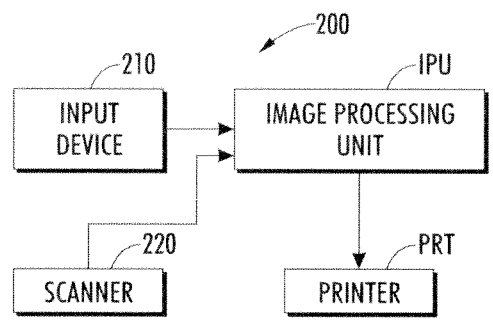
FIG. 3 illustrates a digital imaging apparatus for implementing a system and method in accordance with the present development.

FIG. 3 diagrammatically illustrates an example of a digital image processing apparatus 200 in which the system/method of the present development is implemented. The device comprises an input device 210 for input of the original image data file 10 from a disk, CD, random access memory, computer workstation, network connection or other data source. The device also comprises a scanner 220 for scanning the legacy hardcopy 100. The input device 210 and scanner 220 are connected to provide input to an image processing unit IPU that comprises a combination of hardware and software that perform digital image processing operations in accordance with the present development. The image processing unit IPU is connected to an image output device PRT comprising a print engine for depositing ink or toner on paper or another recording media in response to the output of the image processing unit. Typically, the image output device is a CMYK printer device as is known in the art.

It should be understood that the mapping between the color pairs can be implemented in a variety of ways. The first and most common way determines a multi-dimensional look-up table relating digital count values from the electronic original to new digital count values that should be printed to reproduce the hardcopy output, minus its physical deficiencies as noise, inks and the like. In an alternate implementation, the color pairs can be used to derive, e.g., via standard regression, a transformation matrix of predetermined dimensionality. A simple form would be the derivation of a 3×3 transformation matrix from the color pair data, or the derivation of gain and offset parameters.

It should also be noted that in the table implementation, table values that were not derived from the color pairs can be smoothly interpolated from neighboring color pairs. And, in cases where noise suppression is desired, a relaxation parameter can be used in such interpolations biasing the process towards the "no-operation" direction as is commonly done in all image processing scenarios in the presence of noise.

A second step can be introduced to the process described above (i.e. first step) wherein the first step is subsequently augmented by a colorimetric second step (here, colorimetric refers to multi-channel measurement as done with a Gretag, XRite or similar devices) based on visually relevant constant color areas.

A colorimetric match based on scanner data is only an approximation to a colorimetric match created by an actual colorimetric measurement device. However, the advantage of the scanner match is the easy access to many measurement points—essentially every pixel in the image that is deemed to be in a color constant region—and the resulting fast match for a large amount of points. Considering the widespread use of scanners for image reproduction, one also can understand that the approximate match is sufficient in a large number of applications.

In order to improve on the so-far described scanner-based match, one can subsequently augment the large number of color match pairs with a small number of color match pairs that are generated by a colorimetric measurement device in areas of the image that are visually relevant.

It is to be appreciated from simple size considerations that there will always be fewer visually relevant constant color areas than there will be areas that are considered constant color areas for the purpose of color matching through the scanning process. It is thus an intention to identify a small set of visually relevant constant color areas and to use the information gathered from these areas in a second step to update/modify the color matching obtained from the scanner-based color pairs in the first step.

It is understood that this problem cannot be solved by standard colorimetric approaches. First, it is not evident that any type of measurement patches or control fields are available on the legacy print (i.e. hardcopy print 100). Secondly, even if control patches were available, these would normally cover only very few colors of the entire gamut. Thus, it is desirable to have a system that derives the calibration colors from arbitrary document content.

As part of scanner-based color matching, some underlying processing can be performed that was not mentioned above. For one, the geometrical matching of the paper copy and the electronic copy can be performed leading to a well defined geometrical relationship between the legacy paper document and the digital source. For example, the paper document might have been printed with an image shift on the device, e.g. increasing the top margin and reducing the bottom margin, and/or the legacy document. Further, manual additions might have been added to the legacy document, like handwritten markings, punch-holes and staples and these areas are also known since they resulted in a clear color mismatch between the scanner and electronic data. Even further, unintentional changes like smears, fold lines, etc can also result in image areas that cannot be matched and thus are known. It is important, that for the purpose of the matching, one only needs to know that two areas could not reliably be matched, i.e.: their color difference was too large to be considered, and that it is not necessary to know or identify the cause for this mismatch. The above mentioned examples are only to illustrate that the system internally would only distinguish areas that can be matched and areas that cannot be matched.

Figure 4:
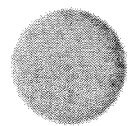
FIG. 4 displays an approximate object size for the standard 2° observer area (i.e. at normal reading distance); and, FIG. 5 displays an initial user Interface to create exemplary lab values for an automatically determined number of locations on a legacy hardcopy.

After the first step, one has a color transformation that is accurate to within some common scanner/copier quality parameter. This may not be enough for some cases, for example, if large constant colors make a visual comparison easy. However, the notion of colorimetric match for "small" areas does not firmly exist. Illustratively, a small area can assume a 2° observer area which is a patch having a diameter of 1 cm or 0.5 inch as is shown in FIG. 4.

It is important that any visual color differences between electronic and paper copy apply to some large object on the print. Aspects of this disclosure are thus to identify those areas, to create a colorimetric measurement of those areas, and to use the colorimetric data to update/modify the original color transform created based on the scanner data. As part of the geometric matching of digital and paper copy, one can identify object types and certain object attributes (wrt color) inside the system. One of the identified properties can be described as "constant color" as well as the precise location of that area on both paper and electronic document. These areas are small from a human observer perspective, but large enough to eliminate halftoning effects and large enough to detect edge transitions in the scan.

One can now examine these "constant color" areas and sort them by size. This can be done exemplary by flood-filling the individual areas and creating a total pixel count (area) as well as an indication of compactness (e.g.: aspect ratio). From that, a sorting table of N' entries can be determined that lists the individual areas by their size (i.e. descending order). It is to be appreciated that the "size" is a determinant of visual importance. The table can then be pruned to have the N most relevant colors of the document, along with their current color value, their digital color value (from the source digital file) and the corresponding physical locations and geometry. This information can now be used to create colorimetric values from the user in a semi/automatic way. It is to be appreciated that there will always be more constant color areas for the purpose of scanner matching than there are visually relevant constant color areas, thus the N relevant colors will always be a much smaller set than the N' elements of the overall table. In general, one can assume that there are only a handful of areas on a page that have visually relevant constant colors, i.e. commonly three or four, but typically not more than approximately ten for a standard page size.

Figure 5:
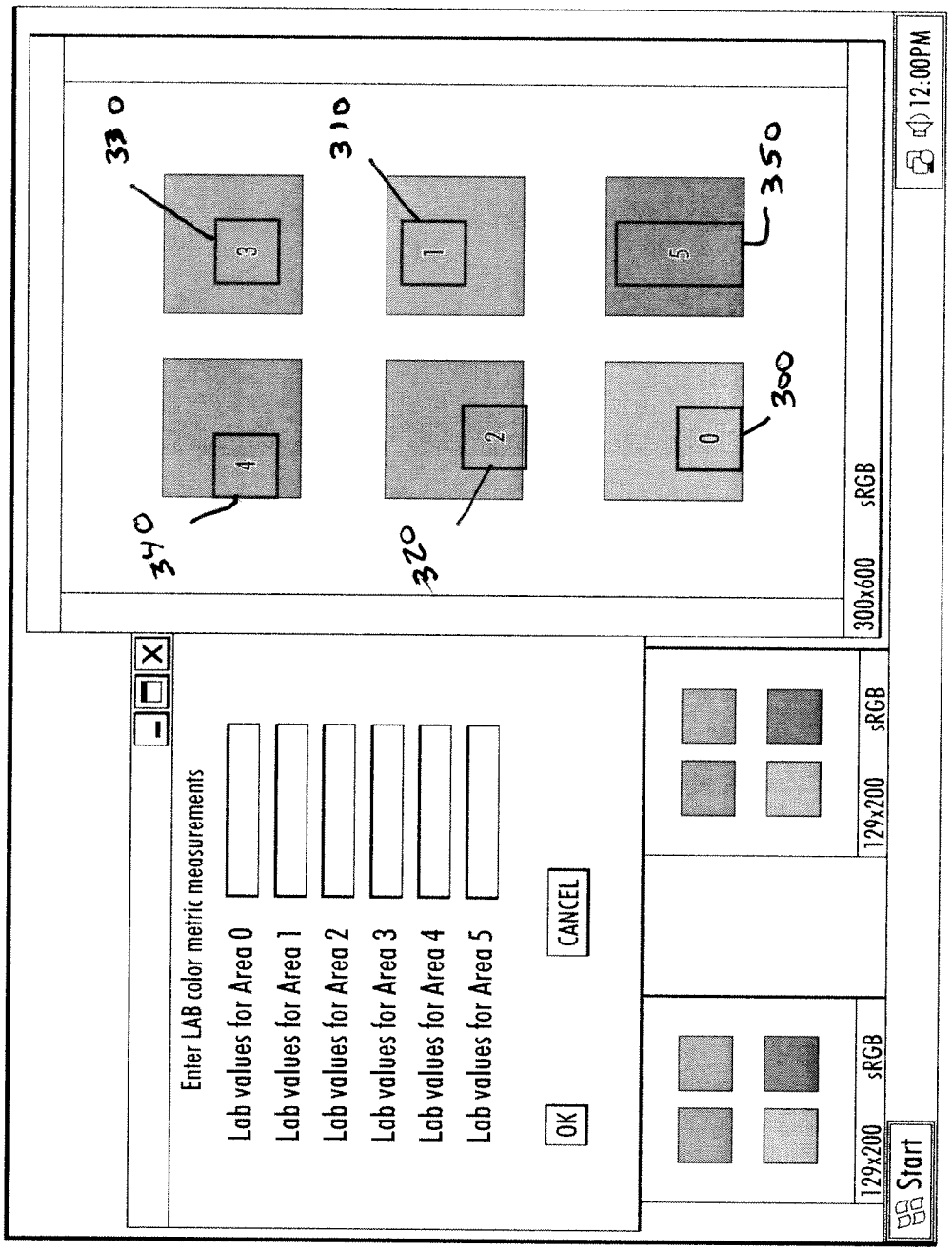

In a semi-automatic adjustment, a communication with the user can be established to determine what area of the page has to be measured off-line. This can be done by showing a sample of the document, with markings like "circles" or "rectangles" overlayed that indicate the measurement area. FIG. 5 shows a screenshot of such a display. It is to be appreciated that the areas (Area 0-Area 5) to be measured contain relatively large constant color areas. In this manner, the user can position the colorimeter inside the correct general area and thus no fine manual adjustments are needed.

As can be seen from FIG. 5, individual image areas 300, 310, 320, 330, 340, 350 are numbered and displayed to the user. These areas are created automatically and the total number of areas is a function of the actual document content. In most documents, only two or three document areas are determined, since most pages do not contain a multitude of large constant color areas.

In one arrangement, the number of measurement areas, i.e. rectangles, created can follow a "preset" which identifies minimum area size, as well as maximum area number. The rectangles can be, for example, 1 inch square or larger, in order to be easily measurable by a human.

Alternatively to the display version, the user can print a sheet that shows the document along with the indicated areas. This is useful if the measurement device is in a separate room from the scanner/monitor.

In one fully automatic method, the geometrical data displayed to the user in the semi-automatic way is directly transmitted to a robotic colorimetric measurement device, where any device that is capable of being positioned to an arbitrary spot by automatic means is considered sufficient.

As described, the colorimetric measurement has now generated a few lab values that can be used by the system to update the color transform. Since this is a subsequent step, one can expect all entered lab values to be in relatively close proximity—in terms of lab—to the scanner created values. In the color adjustment, one can distinguish between different object types and the updating mechanism can be used differently for the different types. It is to be appreciated that the location and type of all objects on the scanned page are known. Two types are briefly outlined hereinafter. One type of object is a constant fill. Constant fills are a trivial extreme in print scenarios. In this case, only that specific color needs to be modified. Since all object types have their own transforms attached, this only influences a specific color of a specific object type. Another type of object is an image file. Image files rarely have a large constant area, however, this is still occurring inside the PDF. In this scenario, the newly colorimetrically measured color has to update a complete ICC profile. This can be done in two basic ways as described hereinafter. The original color value (scanner generated) can be replaced by the colorimetrically obtained value. This can also include attaching the statistical relevance (frequency of occurrence) from the original color value to the new colorimetric value, i.e. the area size weighting is maintained. This essentially is re-running the original color value ICC creation with a partially different set of data. Alternatively, the colorimetric value can be used to modify the original color value output table. In this case, the colorimetric value is used as a "shift" to globally move the transform computed by the original color value. This shift can be done while maintaining some anchors (black, white). In this scenario, it can be assumed that the scanner response used in original color value is the equivalent of a "cast" influencing large parts of color space and not the individual color.

It is to be understood that the restriction to "constant" areas is made for convenience. There are objects that are not constant but still have a good chance of being accurately measured. An example is a sweep between to different colors. Since the "edge" of the sweep is very understandable in "human terms", one can expect an accurate measurement for those areas, especially, since there is an error checking in the inputting step, as mentioned above.

It is to be appreciated that from the scan and colorimetric update, no clear statement can be made for the underlying reason of the difference between colorimetric data and scanner data. In essence, one cannot know if the scanner $\Delta E$ was systematic, i.e. caused by using an inappropriate profile offset|photo|xerographic|inkjet, or if it was just the expected $\Delta E$ caused by the scanner calibration. Correspondingly, one cannot automatically, at this point, select between the two approaches.

Optimizing the selection not based on best performance, but on fail-safety, one can chose to implement (as default) the first approach. Again, in this approach, one can substitute the scanner created lab value by the colorimetrically generated lab value and start the original color value process with this new input data.

Creating a "ProofMatch" upgrade of the existing original color value technology can be done by starting with the basic approach. Rather than completing the calculation, the Proof-Match interface will create an intermediate stop-point at which colorimetric data can be entered manually or automatically.

One advantage of this approach is that all areas that would lend themselves to a colorimetric verification by a user will have a colorimetric match. Only the page locations that are part of a complex scene or are too small for colorimetry will not be colorimetrically matched. Thus all places that a user can "see", i.e. the 2° observer, will be perfectly matched and in all other areas, the term "color match" has no visual relevance.

While particular embodiments have been described, alternatives, modifications, variations, improvements, and substantial equivalents that are or may be presently unforeseen may arise to applicants or others skilled in the art. Accordingly, the claims as filed and as they may be amended are intended to embrace all such alternatives, modifications variations, improvements, and substantial equivalents.

What is claimed is:

1. A method for color matching original image data to a printed hardcopy document previously generated from said original image data, said method comprising:
inputting said original image data; scanning said printed hardcopy to derive and input scanner image data that represent said printed hardcopy;
identifying constant color objects in said original image data;
for said constant color objects in said original image data, identifying respective corresponding hardcopy color areas in said scanner image data;
analyzing color differences between said constant color objects and the corresponding hardcopy color areas to determine a printing device assumption to predict a printing device on which said printed hardcopy document was previously printed;

based upon said predicted printing device, converting at least said constant color objects and said respectively corresponding hardcopy color areas into a colorimetric color space;

adjusting a color of at least one of the constant color objects to match a corresponding color of the respectively corresponding hardcopy color area in said colorimetric color space;

determining at least one measurement area located on said printed hardcopy document;

measuring colorimetrically said at least one measurement area;

comparing said at least one measurement area to an expected color value; and, adjusting another color of at least another one of the constant color objects to match a corresponding color of the respectively corresponding hardcopy color area in said at least one measurement area.

2. The method as set forth in claim 1, further comprising: determining at least another measurement area located on said printed hardcopy document.

3. The method as set forth in claim 2, wherein the total number of measurement areas is a function of the actual document content.

4. The method as set forth in claim 3, wherein the measurement areas are rectangles.

5. The method as set forth in claim 4, wherein said rectangles are at least one inch square.

6. The method as set forth in claim 1, wherein said at least one measurement area is from about 0.7 cm to about 1.3 cm in diameter.

7. The method as set forth in claim 1, wherein said at least one measurement area includes a large constant color area.

8. The method as set forth in claim 1, wherein said at least one measurement area is created automatically.

9. A method for printing a new hardcopy using a legacy hardcopy and an electronic file comprising original image data, wherein the legacy hardcopy was printed from a modified version of the original image data, said method comprising:

inputting said original image data into an image processing unit; scanning said legacy hardcopy to derive scanner data that describe said legacy hardcopy and inputting said scanner data into said image processing unit;

identifying a plurality of different color objects in said original image data;

identifying a plurality of different color areas in said scanner data, wherein said plurality of color areas correspond respectively to and result from said plurality of color objects identified in said original image data, and wherein the color objects and the color areas corresponding respectively thereto define a plurality of color pairs;

converting the color pairs into a colorimetric color space;

based on at least one color pair, creating a mapping between digital input colors and requested print colors;

determining at least one measurement area from the digital data that has the attribute of being visually relevant and creating a colorimetric measurement of said at least one measurement area;

comparing said at least one measurement area to an expected color value; and, adjusting another color of at least another one of the constant color objects to match a corresponding color of the respectively corresponding hardcopy color area in said at least one measurement area, wherein dependent on the object type;

the colorimetric adjustment selectively is done locally in color space or the colorimetric measurement is used to refine color space.

10. The method as set forth in claim 9, further comprising: determining at least another measurement area located on said printed hardcopy document.

11. The method as set forth in claim 10, wherein the total number of measurement areas is a function of the actual document content.

12. The method as set forth in claim 11, wherein the measurement areas are rectangles.

13. The method as set forth in claim 12, wherein said rectangles are at least one inch square.

14. The method as set forth in claim 9, wherein said at least one measurement area is from about 0.7 cm to about 1.3 cm in diameter.

15. The method as set forth in claim 9, wherein said at least one measurement area includes a large constant color area.

16. The method as set forth in claim 9, wherein said at least one measurement area is created automatically.

17. A printing method comprising:

inputting an electronic file comprising original digital image data;

scanning a printed legacy hardcopy image that was previously printed from said electronic file to derive scanner image data;

identifying a color area in said original digital image data;

identifying a corresponding color area in said scanner image data that corresponds to said color area;

defining an adjusted electronic file comprising adjusted digital image data that represent said legacy hardcopy by adjusting a color of the color area in said original digital image data to match a corresponding color of the corresponding color area;

determining from the electronic data file areas that are visually relevant with respect to human color vision;

creating a colorimetric measurement of said areas; and, using the colorimetric measurements to update the scanner based measurements in the previous step.

18. The method as set forth in claim 17, further comprising: determining at least another measurement area located on said printed hardcopy document.

19. The method as set forth in claim 17, wherein said at least one measurement area is from about 0.7 cm to about 1.3 cm in diameter.

20. The method as set forth in claim 17, wherein said at least one measurement area includes a large constant color area.

21. The method as set forth in claim 17, wherein the total number of measurement areas is a function of the actual document content.

22. The method as set forth in claim 17, wherein the measurement areas are rectangles.

* * * * *